United States Patent [19]
Constable et al.

[11] 3,710,136
[45] Jan. 9, 1973

[54] ELECTRONIC COMBINATION LOCK

[75] Inventors: Geoffrey Ernest Patrick Constable; Godfrey George Holter, both of Cheltenham, Gloucestershire, England

[73] Assignee: Smiths Industries Limited, London, England

[22] Filed: Jan. 27, 1971

[21] Appl. No.: 110,191

[52] U.S. Cl. ............... 307/109, 70/278, 317/134, 320/1
[51] Int. Cl. ............. H01h 47/00, E05b 47/00
[58] Field of Search ........... 307/109; 320/1; 70/278; 317/134

[56] References Cited

UNITED STATES PATENTS

| | | | |
|---|---|---|---|
| 3,522,488 | 8/1970 | Tellerman | 70/278 X |
| 3,513,357 | 5/1970 | Dittmore | 317/134 |
| 3,321,673 | 5/1967 | Wolfe | 70/278 X |
| 3,555,510 | 1/1971 | Hesselgren | 317/134 X |
| 3,587,950 | 6/1971 | Haigh | 70/278 X |

Primary Examiner—Bernard Konick
Assistant Examiner—Stuart Hecker
Attorney—William D. Hall, Elliott I. Pollock, Fred C. Philpitt, George Vande Sande, Charles F. Steininger and Robert R. Priddy

[57] ABSTRACT

A combination lock includes four capacitors that are connected via rectifier-intercoupled plugs to the sockets of selected ones of 10 switch units which have individual push-buttons annotated with the digits "0" to "9." Operation of the push-buttons of the selected switch units in turn to enter a four-digit combination programmed by the plugging, transfers electric charge from one to the other of the capacitors and thence to energize a solenoid to release a latch mechanism of the lock. Digit-entry deviating from the programmed sequence discharges the capacitors to inhibit charge transfer to the solenoid until the sequence is restarted. In a modification the four capacitors are replaced by capacitors in the individual switch units, charge transfer in response to entry of the correct combination being only between the capacitors of those units selected by rectifier-intercoupled plugging.

2 Claims, 2 Drawing Figures

ELECTRONIC COMBINATION LOCK

This invention relates to access-control apparatus.

Access-control apparatus according to the invention comprises a plurality of switching devices, a plurality of capacitive elements, a release device that is operable for the enabling of access, and electric circuit means interconnecting the release device with at least some of the switching devices and at least some of the capacitive elements in such a manner that operation of these switching devices in a predetermined sequence is effective to transfer electric charge from one to the other of these capacitive elements and thence effect operation of the release device.

There may be fewer capacitive elements than switching devices and in these circumstances electrical connection means may be provided for establishing electrical connections from the capacitive elements to respective, selected ones of the switching devices, and also from one to another of the selected switching devices in sequence to the release device, such that operation of the selected switching devices in the appropriate sequence causes charge transfer from one to another of the capacitive elements to bring about operation of the release device. Alternatively, each switching device may have its own individual capacitive element and in these circumstances the connection means may be provided simply for establishing electrical connections between certain selected ones of the switching devices in sequence to the release device, such that operation of the selected switching devices in appropriate sequence causes charge transfer between only those of the capacitive elements that are associated with the selected devices. In either case, the connection means may be such that the particular ones of the switching devices that are selected is variable selectively. The connector means in this latter respect may for example involve the mating of a plurality of electrical plugs with any selected ones of a larger plurality of electrical sockets that are associated individually with the switching devices, and in these circumstances the particular group of switching devices selected and the sequence in which they are interconnected can be readily changed by withdrawal and redistribution of the plugs in the sockets.

Although in the context of the arrangements referred to in the preceding paragraph only some of the switching devices are at any one time interconnected with the release device, the invention is not limited to these circumstances. All the switching devices may be involved, and in these circumstances it may be arranged that operation of the release device is effected only after all the switching devices have been operated in a predetermined sequence. The ordering in the sequence may be selectively variable in this case also, as for example by plug redistribution.

The switching devices may be interconnected with one another in such a way that operation of any one of them out of said sequence is effective to dissipate charge transferred between the capacitive elements, whereby further transfer of charge to effect operation of the release device cannot take place until the correct sequence of switching-device operation is restarted.

Access-control apparatus in accordance with the present invention is applicable to the provision of a combination lock, and in this respect a combination lock that includes access-control apparatus according to the invention will now be described, by way of example, with reference to the accompanying drawings, in which.

Figure 1:
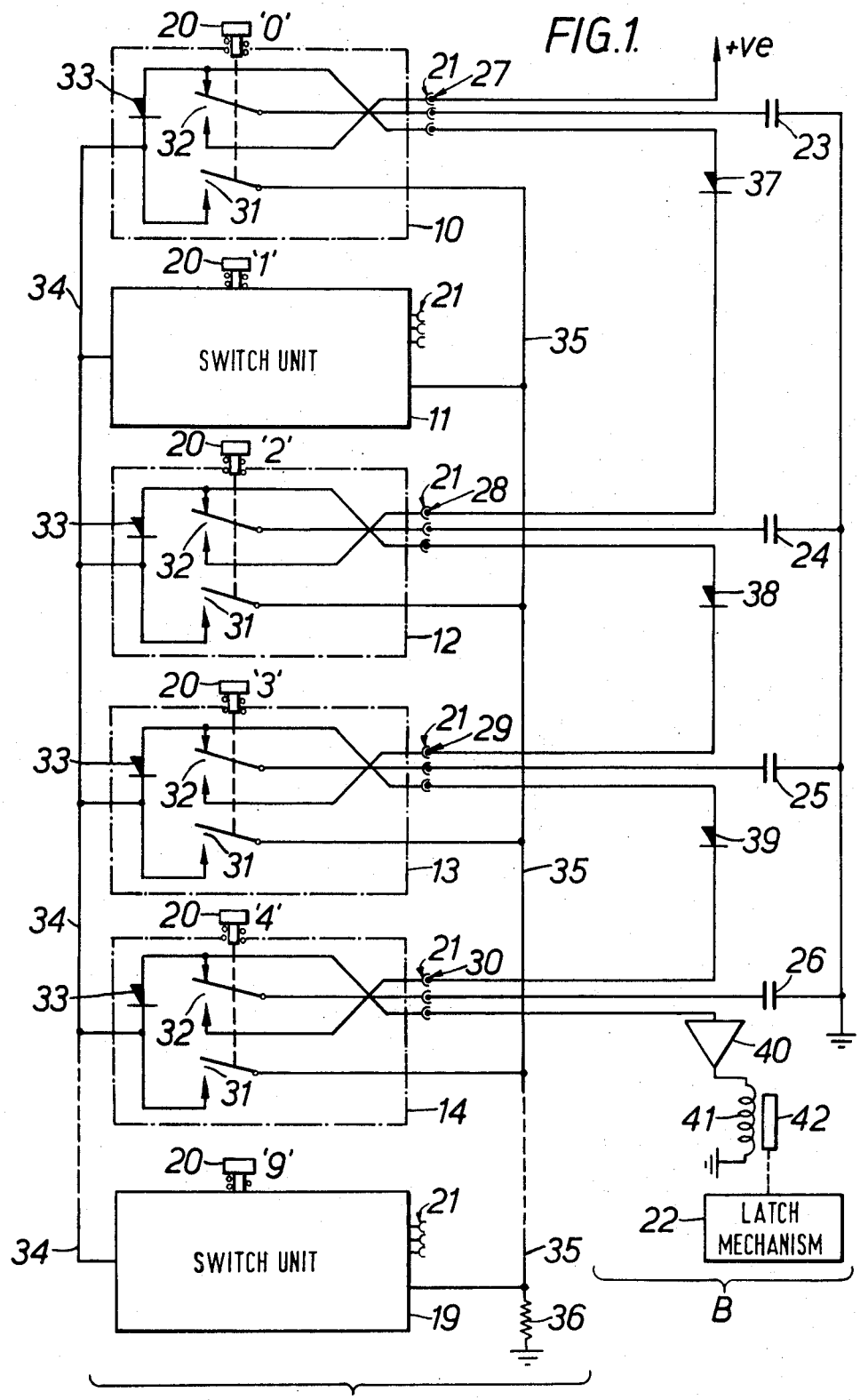
FIG. 1 shows a circuit diagram of the combination lock.

Referring to FIG. 1, the lock consists of a signalling part A and an actuator part B. The signalling part A comprises ten interconnected switch units 10 to 19 (of which only six are shown) that each have a push-button 20 and a three-terminal connector-socket 21. The push-buttons 20 of the units 10 to 19 are annotated with the digits "0" to "9" respectively, and are operable manually to enter a four-digit combination into the lock one digit after the other. It is only in the event that the sequence of four digits entered is the same as that programmed into the lock that there is release of a latch mechanism 22 in the actuator part B.

The actuator part B includes four capacitors 23 to 26 that are connected between individual three-terminal connector-plugs 27 to 30, and ground. The plugs 27 to 30 can be mated with the sockets 21 of any selected four of the units 10 to 19. The four units selected in this way, and the order in which the plugs 27 to 30 establish connection with them, determine the unique sequence of four digits that it is necessary to enter through the push-buttons 20 to obtain release of the latch mechanism 22. In the specific case illustrated in FIG. 1, the plugs 27 to 30 are mated with the sockets 21 of the units 10, 12, 13 and 14, and in this way program the lock for release only in response to push-button entry of the four-digit combination "0234."

The push-button 20 of each unit 10 to 19 has two switch sets, one a single-pole single-throw switch 31 that is normally open and the other a single-pole double-throw switch 32 that has an associated rectifier 33. The single-throw switch 31 is connected in the relevant unit 10 to 19 between a bus line 34 and a bus line 35 which is connected to ground via a resistor 36 and which, like the line 34, is common to all ten units 10 to 19. The double-throw switch 32 on the other hand serves to connect the center terminal of the socket 21 to a first of the two other, outer socket-terminals and also via the associated rectifier 33 to the line 34. The socket-terminal connections established in this way in the selected series of four units (illustrated in FIG. 1 as the units 10, 12, 13 and 14) to which the plugs 27 to 30 are mated, connect each of the capacitors 23 to 26 to two possible paths for discharge. In particular the capacitor 23 is connected to the line 34 via the rectifier 33 of the first (illustrated in FIG. 1 as the unit 10) of the four units, and also back through the plug 27 to the plug 28 via a rectifier 37. The capacitors 24 to 26 are similarly connected to the line 34 via the rectifiers 33 of the second, third and fourth units (illustrated in FIG. 1 as the units 12, 13 and 14) of the selected series, and also back through their respective plugs 28 to 30. The connections back through the plugs 28 and 29 extend via individual rectifiers 38 and 39 to the plugs 29 and 30 respectively, but the connection from the capacitor 26 back through the plug 30 extends to an amplifier 40 and from this via a coil 41 to ground. Energization of the coil 41 attracts a soft-iron armature 42 and it is movement of the armature 42 so caused that is used to release the latch mechanism 22.

Depression of the push-button 20 of any unit 10 to 19 closes the switch 31 of that unit to establish connection of the line 34 to the line 35 and thence via the resistor 36 to ground. The switch 32 of the unit is also operated and changes over connection of the center terminal of the socket 21 from the first to the second of the two outer socket-terminals. This changeover is of effect only in those circumstances in which one of the plugs 27 to 30 is mated with the socket 21, the effect in these specific circumstances being to establish a charging path for the capacitor 23 to 26 associated with that particular plug. In the case of the unit (illustrated in FIG. 1 as the unit 10) having the plug 27 mated with its socket 21, the changeover has the effect of connecting the capacitor 23 back through the plug 27 between the positive pole and the grounded negative pole of a direct-current source (not shown), whereas in each of the other three cases (illustrated in FIG. 1 as the units 12, 13 and 14) the effect is to connect the relevant capacitor 24 to 26 back through its associated plug 28 to 30 and one of the rectifiers 37 to 39, to be charged from the preceding capacitor 23 to 25.

Release of the depressed push-button 20 returns the switches 31 and 32 in the unit concerned to their normal, unoperated conditions. Connection of the line 34 to the line 35 and ground through this switch 31 is thereby broken, and if the unit concerned has its socket 21 mated with one of the plugs 27 to 30, the capacitor 23 to 26 associated with that plug is again connected through the switch 32 ready for discharge. Irrespective of which unit 10 to 19 is involved, however, normal circuit connections are restored throughout the equipment, and this leaves the capacitor 26 as the only one of the four with a complete discharge path to ground. This path extends via the amplifier 40 and coil 41, but there is sufficient charge on the capacitor 26 to result in energization of the coil 41 for release of the latch mechanism 22, only if the programmed sequence of push-button operation has been followed. With this sequence there is firstly charging of the capacitor 23 from the direct-current source, then transfer of charge from the capacitor 23 to the capacitor 24 followed by transfer of charge from the capacitor 24 to the capacitor 25, and finally transfer of charge from the capacitor 25 to the capacitor 26. The efficient transfer of charge energy from one capacitor to the next in this way is facilitated by providing the capacitors 23 to 26 with values that are at least approximately in the ratios 1,000: 100: 10: 1, that is to say with each capacitor in the ordered sequence of a value some 10 times smaller than that of the preceding capacitor and some 10 times larger than that of the succeeding one.

Operation of the lock to obtain release of the latch mechanism 22 will now be described in greater detail in the context of the specific programming illustrated in FIG. 1, that is to say, where the combination required for release is "0234."

Depression of the push-button 20 of unit 10 to signal the first digit "0" operates the switches 31 and 32 of that unit to connect the line 34 to ground via the line 35 and resistor 36, and the capacitor 23 to the positive pole of the direct-current source. The capacitor 23 accordingly charges to the source voltage and, by virtue of the changeover of the switch 32, is unaffected by the ground connection to the line 34. This ground connection, however, is effective to ensure that any energy at this time stored by the capacitors 24 to 26 is to a substantial extent dissipated, discharge taking place to the line 34 through the unoperated switches 32 and associated rectifiers 33 of the units 12, 13 and 14. As soon as the push-button 20 of unit 10 is released the ground connection to line 34 from line 35 is broken by the return of the switch 31 in this unit, and so there is no discharge of the capacitor 23 when the switch 32 of the unit 10 is restored to its normal, unoperated condition.

When the push-button 20 of unit 12 is now depressed to signal the second digit "2," charge on the capacitor 23 is transferred to the capacitor 24 via the unoperated switch 32 of unit 10, rectifier 37, and the operated switch 32 of unit 12. At the same time line 34 is again connected to line 35, but this time via the switch 31 of unit 12, to establish a ground connection and ensure that capacitors 25 and 26 are discharged. Although there is at this time a path to ground from the capacitor 23 through the unoperated switch 32 of the unit 10 and the line 34, this is of a materially higher resistance than the path through the rectifier 37 to the capacitor 24, and so does not prejudice a significant transfer of charge energy to the capacitor 24. Upon release of the depressed push-button 20 and consequent return of the switches 31 and 32 in the unit 12, therefore, the capacitor 24 stores charge, and the capacitor 23 is left, like the capacitors 25 and 26, in a substantially discharged state.

Depression next of the push-button 20 of unit 13 to signal the third digit "3," acts in a similar manner to bring about the situation in which upon release of this push-button, the capacitor 25 stores charge transferred from the capacitor 24, and the capacitors 23, 24 and 26 are all in a substantially discharged state. Similarly when, following this, the push-button 20 of unit 14 is depressed to signal the fourth digit "4," charge is transferred from the capacitor 25 to the succeeding capacitor 26. However release of this push-button and return of the switch 32 of unit 14 to its unoperated state, re-establishes the path over which energy stored in the capacitor 26 is immediately discharged into the amplifier 40. The release of the push-button 20 of the unit 14 at the end of the signalled sequence of the four-digit combination "0234," accordingly brings about energization of the coil 41 and release of the latch mechanism 22.

The latch mechanism 22 is released only if the correct, four-digit combination is signalled. If an incorrect digit is signalled at any stage, then any charge stored by earlier circuit operation is dissipated and it is necessary to restart the sequence before release can be obtained. For example, if with the programming shown in FIG. 1, the digit "1" is signalled by erroneous operation of the push-button 20 of unit 11 after the digits "0," "2" and "3" have been correctly signalled, then the consequent closure of switch 31 in unit 11 establishes connection of the line 34 to ground via the line 35, and thereby provides a discharge path through the switch 32 of unit 13 for the charge then stored on capacitor 25. Similarly if the digit "4" were signalled by operation of the push-button 20 of unit 14 before the capacitor 25 has been charged, closure of the switch 31 in the unit 14 establishes a discharge path to ground for the three capacitors 23 to 25; in this way insufficient charge remains on either of capacitors 23 and 24 to enable subsequent charging of the capacitor 25 and can only be re-established by signalling the digits "0" and "2" in sequence.

The connection of the plugs 27 to 30 to the units 10, 12, 13 and 14 to program the lock to operate only in response to the signalled combination "0234" is by way of illustration only. The plugs 27 to 30 may be connected to any other grouping of four units 10 to 19 to change the program. There is no restriction on the order in which the plugs 27 to 30 are connected to the units 10 to 19, and another combination selected could be, for example, "9042," requiring operation of the push-buttons 20 of units 19, 10, 14 and 12, in that order.

The whole equipment shown in FIG. 1 may be readily housed in a door, or in a wall adjacent a door, that opens into a room or other area to which access is to be restricted by the lock. The latch mechanism 22 in these circumstances serves to lock the door in the closed position until it is released by energization of the coil 41. The only parts that need be available to the exterior of the door are the ten annotated push-buttons 20, and these may be carried by a panel that also acts as a protective shield for the remainder of the equipment. The direct-current source may be provided simply by a low-voltage battery housed behind the panel also.

Figure 2:
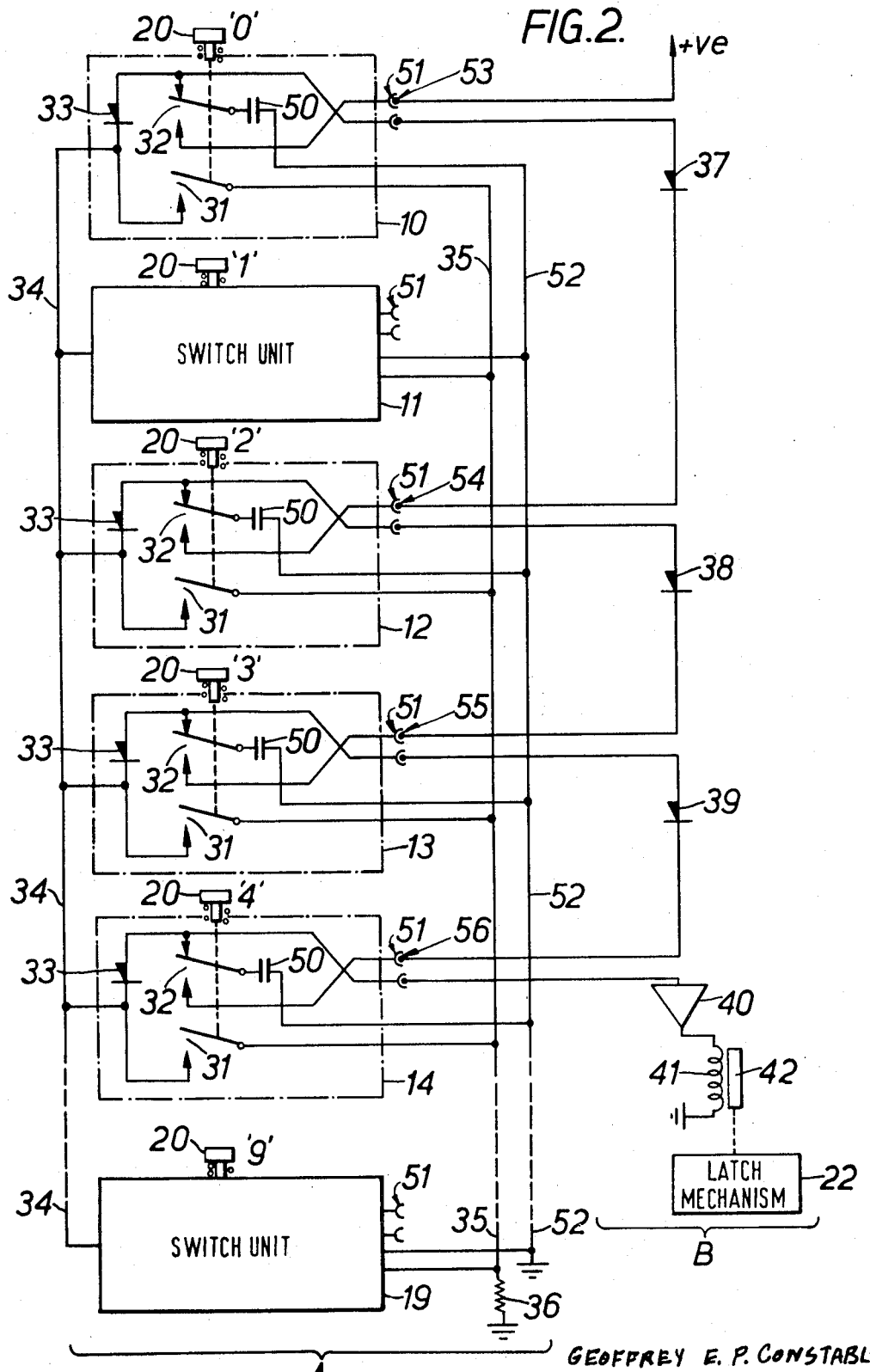
FIG. 2 shows a modification of the circuit diagram of FIG. 1.

The arrangement of FIG. 1 may be modified as shown in FIG. 2 to reduce the interconnections required between the signalling part A and the actuator part B. In this case the four capacitors 23 to 26 are replaced by ten capacitors 50 that are of the same value as one another and are incorporated in the ten switch units 10 to 19 respectively. This avoids the need for three socket-terminal connections in each unit 10 to 19, and each socket 21 is accordingly replaced by a two-terminal socket 51. The capacitors 50 are connected between the switches 32 of their respective units 10 to 19 and a common grounded line 52, and connection to them for charging purposes is established via four two-terminal plugs 53 to 56 that are mated with the sockets 51 according to the programmed combination desired.

Operation of the modified circuit arrangement shown in FIG. 2 is in essence the same as that of the arrangement shown in FIG. 1. With the particular programmed combination illustrated, signalling of the digit "0" by depression of the push-button 20 of unit 10 charges the capacitor 50 in unit 10. Subsequent operation of the push-buttons 20 of units 12, 13 and 14 to signal the digits "2," "3" and "4" in turn, transfers charge successively to the capacitors 50 in the units 12, 13 and 14 and thence to the amplifier 40 to bring about release of the latch mechanism 22.

The voltage of the direct-current supply source required for the arrangement of FIG. 2 is in general larger than that required for the arrangement of FIG. 1, since the capacitors 50 are of the same value as one another and there is thus some inefficiency of charge transfer between them.

It is to be understood that the present invention is not limited to circumstances in which a four-digit combination is involved. More or fewer digits may be used, the number being merely dependent upon the number of plug connections established from the actuator part B, and, in the case of the equipment shown in FIG. 1, the number of capacitors provided. The number of switch units likewise, is not restricted to 10.

We claim:

1. Access-control apparatus comprising a plurality of selectively-operable switching means, a plurality of capacitive means, electrically-energizable release means that is operable for enabling access in response to the application of electrical energy to said release means, and circuit means connecting at least some of the switching means in cascade to the release means, said circuit means including means interconnecting at least some of said capacitive means with the cascade-connected switching means to form thereby a plurality of sub-circuits each of which comprises an individual one of said switching means and an individual one of said capacitive means, means responsive to operation of the switching means of a first of said sub-circuits to establish electrical charge in the capacitive means of that sub-circuit, means connecting the capacitive means of the other said sub-circuits to the capacitive means of said first sub-circuit through the switching means of their respective sub-circuits to transfer at least part of said electric charge from one to another of these capacitive means in succession upon operation of the cascade-connected switching means of said other sub-circuits in a predetermined sequence, means connected to said release means to apply charge transferred in succession from one to another of the capacitive means as aforesaid to operate said release means, and means coupled to said sub-circuits and responsive to operation of the switching means of any said sub-circuit to discharge the capacitive means of all said sub-circuits except the capacitive means individual to the operated switching means, such that following operation of the switching means of said first sub-circuit said electric charge is dissipated, and said release means thereby remains unoperated, unless the switching means of said other sub-circuits are operated one after the other in said sequence.

2. Access-control apparatus according to claim 1 wherein there are fewer capacitive means than switching means, said circuit means includes means for selectively establishing electrical connections from the capacitive means to respective, selected ones of the switching means to form said sub-circuits, and said means for selectively establishing electrical connections from the capacitive means includes means for establishing electrical connections from one to another of the said selected switching means to said release means to connect the said selected switching means to the said release means in the said cascade connection.

* * * * *

PO-1050
(5/69)

UNITED STATES PATENT OFFICE
CERTIFICATE OF CORRECTION

Patent No. 3,710,136        Dated January 9, 1973

Inventor(s) GEOFFREY ERNEST PATRICK CONSTABLE and GODFREY GEORGE HOLTER

It is certified that error appears in the above-identified patent and that said Letters Patent are hereby corrected as shown below:

Foreign Application Priority Data

January 30, 1970    Great Britain. . . . . . 4737/70

Signed and sealed this 29th day of May 1973.

(SEAL)
Attest:

EDWARD M. FLETCHER, JR.
Attesting Officer

ROBERT GOTTSCHALK
Commissioner of Patents